United States Patent [19]

(12) United States Patent
Jamail et al.

(10) Patent No.: US 9,306,961 B1
(45) Date of Patent: Apr. 5, 2016

(54) VISUAL SECURITY WORKFLOW

(71) Applicant: EMC Corporation, Hopkinton, MA (US)

(72) Inventors: John M. Jamail, Sudbury, MA (US); Daniel B. Reich, Sudbury, MA (US); Frederick Dushin, Boxborough, MA (US); Maxim Pevzner, Bedford, MA (US)

(73) Assignee: EMC Corporation, Hopkinton, MA (US)

( * ) Notice: Subject to any disclaimer, the term of this patent is extended or adjusted under 35 U.S.C. 154(b) by 234 days.

(21) Appl. No.: 14/040,226

(22) Filed: Sep. 27, 2013

(51) Int. Cl.
*H04L 29/06* (2006.01)

(52) U.S. Cl.
CPC .................................. *H04L 63/1416* (2013.01)

(58) Field of Classification Search
CPC ............ H04L 63/1416; H04L 63/1424; H04L 63/1425; H04L 63/1433
USPC ........................................................ 726/22
See application file for complete search history.

(56) References Cited

U.S. PATENT DOCUMENTS

| 7,607,169 | B1 | 10/2009 | Njemanze et al. |
| 8,365,278 | B1 | 1/2013 | Njemanze et al. |
| 8,477,379 | B2 | 7/2013 | Viswanathan et al. |
| 2008/0091681 | A1* | 4/2008 | Dwivedi ................. G06F 21/31 |
| 2008/0320552 | A1* | 12/2008 | Kumar .................. G06F 21/552 726/1 |

* cited by examiner

Primary Examiner — Ellen Tran
(74) Attorney, Agent, or Firm — BainwoodHuang

(57) ABSTRACT

An improved technique involves providing a tool that connects standardized content bundles in order to carry out an arbitrarily complex investigation. An investigation server makes content bundles, which perform a standardized set of investigative actions based on a set of inputs, available to an investigation analyst. The investigation analyst selects particular content bundles based on a specified set of input parameters and a desired set of output parameters defining the investigation. The investigation analyst then connects the particular content bundles to form a single, complex workflow configured to produce the desired set of output parameters from the specified set of input parameters as a result of the investigation.

20 Claims, 6 Drawing Sheets

100

Providing a set of content bundles to an investigator, each content bundle performing a respective set of actions based on a set of inputs and providing a set of outputs upon performing the respective set of actions, the set of inputs including identifiers of entities interacting with the computer network

102

Selecting a subset of the set of content bundles based on the specified set of input parameters and the desired set of output parameters defining the investigation

104

Connecting the content bundles of the subset of the set of content bundles to form a single, complex workflow configured to produce the desired set of output parameters from the specified set of input parameters as a result of the investigation

VISUAL SECURITY WORKFLOW

BACKGROUND

Communications networks within organizations are frequently targets of malicious attacks from both within the organization and outside of it. For example, a recently terminated employee of such an organization may use his knowledge of the network to improperly acquire electronic resources from an internal server. In another example, an external hacker may use phishing techniques to lure an unwitting employee to allow the hacker access to electronic resources belonging to the organization via the network.

Such organizations employ technologies such as security incident and event management (SIEM) and data loss prevention (DLP) to help pinpoint unusual activities that may be a signature of a malicious attack. For example, an organization may use a SIEM solution such as enVision from EMC, Inc. of Hopkinton, Mass., to generate reports of unusual activity within the network as determined from various factors such as historical patterns, device characteristics, and the like.

The reports generated from such technologies may form the basis for conventional investigations into specific security problems. For example, a security analyst may use such a report as the basis for an investigation into whether unauthorized users have accessed a privileged shared account. In carrying out the investigation, the security analyst may manually examine the report, or write scripts to automate certain aspects of analyzing the report.

SUMMARY

Unfortunately, there are deficiencies with the above-described conventional investigations into specific security problems. For example, because there are typically a large number of events in a report to analyze, an analyst needs to write advanced automation scripts to carry out even an ordinary investigation. Thus, the skill level required to analyze the recorded event data is very high, even as many of the tasks involved in such analysis are repetitive. Consequently, security resources tend to be misallocated, e.g., a senior-level analyst is required to perform work that is more appropriate for someone at a junior level.

In contrast to the above-described conventional investigations into specific security problems in which senior analysts are required to carry out even an ordinary investigation, an improved technique involves providing a tool that connects standardized content bundles in order to carry out an arbitrarily complex investigation. An investigation server provides content bundles, which perform a standardized set of investigative actions based on a set of inputs, available to an investigation analyst. The investigation analyst selects particular content bundles based on a specified set of input parameters and a desired set of output parameters defining the investigation. The investigation analyst then connects the particular content bundles to form a single, complex workflow configured to produce the desired set of output parameters from the specified set of input parameters as a result of the investigation.

Advantageously, the improved technique allows a less-skilled (i.e., junior-level) analyst to carry out relatively complex investigations, thus better allocating security resources.

One embodiment of the improved technique is directed to a method of performing an investigation into potentially unusual activity in a computer network, the investigation being defined by a specified set of input parameters and a desired set of output parameters indicative of goals of the investigation. The method includes providing, by an investigation server, a set of content bundles to an investigator, each content bundle performing a respective set of actions based on a set of inputs and providing a set of outputs upon performing the respective set of actions, the set of inputs including identifiers of entities interacting with the computer network. The method also includes selecting, by the investigation server under control of the investigator, a subset of the set of content bundles based on the specified set of input parameters and the desired set of output parameters defining the investigation. The method further includes connecting, by the investigation server under control of the investigator, the content bundles of the subset of the set of content bundles to form a single, complex workflow configured to produce the desired set of output parameters from the specified set of input parameters as a result of the investigation.

Additionally, some embodiments of the improved technique are directed to a system constructed and arranged to perform an investigation into potentially unusual activity in a computer network. The system includes a network interface, memory, and a controller including controlling circuitry constructed and arranged to carry out the method of performing an investigation into potentially unusual activity in a computer network.

Furthermore, some embodiments of the improved technique are directed to a computer program product having a non-transitory computer readable storage medium which stores code including a set of instructions which, when executed by a computer, cause the computer to carry out the method of performing an investigation into potentially unusual activity in a computer network.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 6 is a flow chart illustrating an example method of carrying out the improved technique within the electronic environment shown in FIG. 1.

DETAILED DESCRIPTION

The contents of U.S. patent application Ser. No. 13/247,859, entitled "Managing Analysis of Activity Data," are hereby incorporated by reference in its entirety.

An improved technique involves providing a tool that connects standardized content bundles in order to carry out an arbitrarily complex investigation. An investigation server provides content bundles, which perform a standardized set of investigative actions based on a set of inputs, available to an investigation analyst. The investigation analyst selects particular content bundles based on a specified set of input parameters and a desired set of output parameters defining the investigation. The investigation analyst then connects the particular content bundles to form a single, complex workflow configured to produce the desired set of output parameters from the specified set of input parameters as a result of the investigation.

Advantageously, the improved technique allows a less-skilled (i.e., junior-level) analyst to carry out relatively complex investigations, thus better appropriating security resources.

Figure 1:
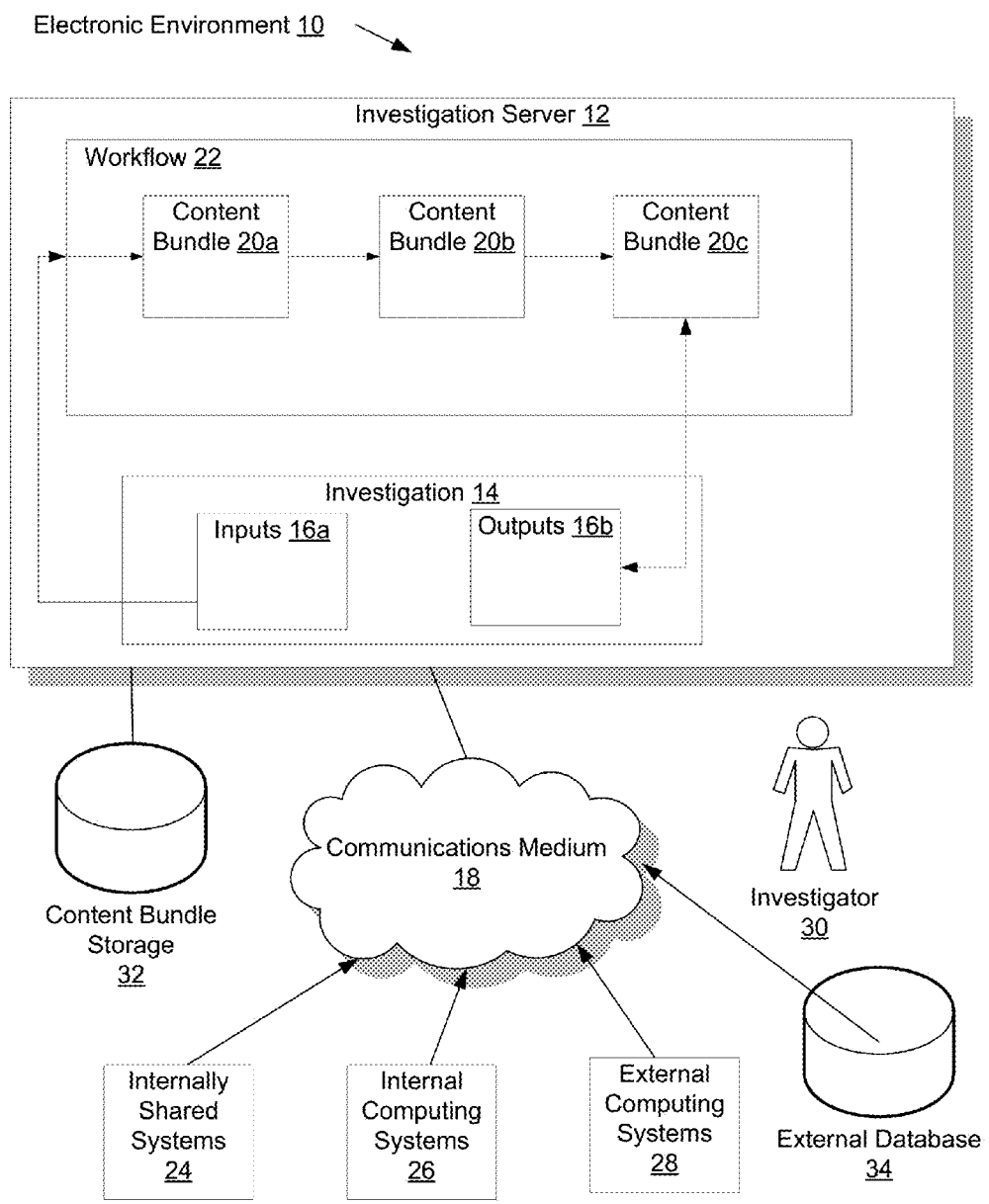
FIG. 1 is a block diagram illustrating an example electronic environment for carrying out the improved technique.

FIG. 1 illustrates an example electronic environment 10 for carrying out the improved technique. Electronic environment 10 includes investigation server 12, internally shared systems 24, internal computing systems 26, external computing systems 28, communications medium 18, external database 34, and workstation 36.

Communication medium 18 provides network connections between investigation server 12, internally shared systems 24, internal computing systems 26, external computing systems 28, external database 34, and workstation 36. Communications medium 18 may implement a variety of protocols such as TCP/IP, UDP, ATM, Ethernet, Fibre Channel, combinations thereof, and the like. Furthermore, communications media 18 may include various components (e.g., cables, switches/routers, gateways/bridges, NAS/SAN appliances/nodes, interfaces, etc.). Moreover, the communications medium 18 are capable of having a variety of topologies (e.g., queue manager-and-spoke, ring, backbone, multi drop, point to-point, irregular, combinations thereof, and so on).

Investigation server 12 is constructed and arranged to process data related to an investigation 14 into unusual activity within a network and present such data visually on workstation 36 for investigator 30. Specifically, investigation server 12 processes instructions from content bundles 20a, 20b, 20c in the course of carrying out investigation 14. Further, investigation server 12 provides connections between content bundles 20a, 20b, 20c to form a single, complex workflow 22. Investigation server 12 may be a server, although in some arrangements investigation server 12 may be a cluster of servers supporting multiple investigations. Investigation server may, in some arrangements, be connected to storage 32 on which content bundles are stored.

Content bundles 20a, 20b, 20c are, in some arrangements, typically XML scripts that perform a series of steps that transform a set of investigation inputs to outputs. Some content bundles may be included as part of a SIEM or DLP application for further processing of event data. Other content bundles may be custom written for specialized tasks. Each content bundle is made available in storage 32 and may be used as a building block into a more complex investigation, which may be automatically processed by workflow 22.

It should be understood that, in addition to inputs, content bundles 20a, 20b, and 20c also take in feeds from external database 34. For example, a feed may include contents of an Active Directory. Also, outputs of content bundles 20a, 20b, and 20c may, in some arrangements, include partial outputs that acts as feeds into other content bundles. More detail concerning these content bundles will be presented below in connection with FIGS. 2, 3, 4, and 5.

Investigation 14 is described by inputs 16a and desired outputs 16b. Each of these may be described as parameters of investigation 14. For example, inputs 16a may be expressed as values of certain parameters associated with the network, e.g., a hostname of a device that is in some manner associated with unusual activity being investigated.

Workstation 36 is constructed and arranged to allow investigator 30 to interact with investigation server 12 in carrying out an investigation. Workstation 36 is, in some arrangements, a desktop PC capable of running an internet browser or similar software having a graphical user interface (GUI). In other arrangements, however, workstation 36 may be a server, a laptop computer, tablet computer, smartphone, or the like. Workstation 36 may be collocated with investigation server 12, or, in some arrangements, may be remote from investigation server 12.

Internally shared systems 24 include servers, storage systems, and the like, inside a network boundary (which defines which system belong to an internal network and which do not), for which several people are authorized to have access. Some system of access control may be imposed on such systems in order to restrict access to authorized individuals. Such systems may provide access to sensitive information, such as salary data for employees within an organization, or other confidential intellectual property.

Internal computer systems 26 include desktop PCs, laptop PCs, tablet PCs, smartphones, and the like, which are connected to the network inside the network boundary. Each such computer is typically associated with one or more employees of an organization and as such has access to certain resources within the network.

External computer systems 28 include desktop PCs, laptop PCs, tablet PCs, smartphones, and the like, which may connect to the network from outside the network boundary if granted access.

External database 34 is constructed and arranged to accept queries from investigation server 12 and provide feeds for content bundles in the course of carrying out an investigation. Examples of feeds provided by external database 34 include LDAP/Active Directory logs, known bad IP addresses from external computer systems 28, and usernames of terminated employees from internal computer systems 26.

During operation, investigator 30 accesses investigation server 12 as part of an investigation 14 into unusual activity on a network. Investigation server 12 then presents investigator 30 with a set of content bundles 20 for use in investigation 14. Investigation server 12 then selects a subset 20a, 20b, and 20c of content bundles 20 based on inputs from investigator 30. Based on input from investigator 30 about investigation 14, investigation server 12 selects content bundles 20a, 20b, and 20c.

Further details of investigation server 12 are discussed below in connection with FIG. 2.

Figure 2:
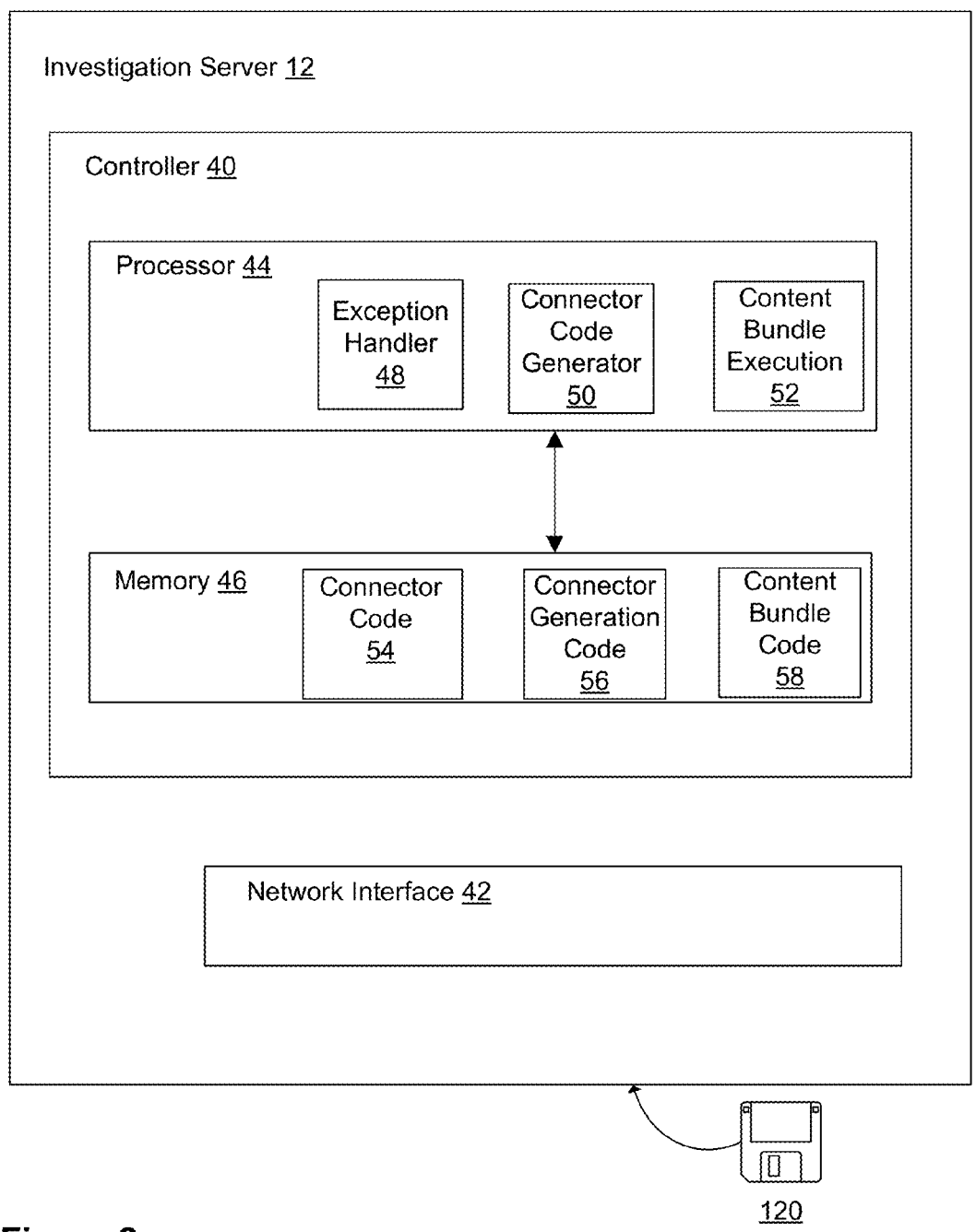
FIG. 2 is a block diagram illustrating an example investigation server within the electronic environment shown in FIG. 1.

FIG. 2 illustrates further details of investigation server 12. Investigation server 12 includes controller 40, which in turn includes processor 44 and memory 46; and network interface 42.

Network interface 42 takes the form of an Ethernet card; in some arrangements, network interface 42 takes other forms including a wireless receiver and a token ring card.

Memory 46 is configured to store content bundle code 58, connector generation code 56, and connector code 54. Memory 46 generally takes the form of, e.g., random access memory, flash memory or a non-volatile memory.

Content bundle code 58 contains instructions for carrying out a set of tasks in connection with a particular investigation. Content bundle code 58 may contain XML code; in some arrangements, content bundle code may contain Javascript, Python, PHP, HTML and the like. In some arrangements, content bundle code 58 also contains instructions for rendering a graphic representation of a content bundle in a browser window on workstation 36.

Connector code 54 contains instructions for converting the output of a first content bundle into a form usable as the input of a second bundle. Connector code 54 may contain XML code; in some arrangements, content bundle code may contain Javascript, Python, PHP, HTML and the like.

Connector generation code 56 contains instructions for generating connector code 54. Connector generation code 56 may be compiled code or interpreted code. In some arrangements, connector generation code 56 may also contain instructions for rendering a graphical representation of a connector in a browser window on workstation 36. In this case, connector generation code 56 is configured to generate connector code 54 when a graphical condition on workstation 36 has been met, e.g., a graphic representing a connector has been joined to an output terminal of a graphic of a first content bundle and an input of a graphic of a second content bundle.

Processor 44 takes the form of, but is not limited to, Intel or AMD-based MPUs, and can include a single or multi-cores each running single or multiple threads. Processor 44 is coupled to memory 46 and is configured to execute instructions from content bundle code 58. Processor 44 includes a content bundle execution engine 52 for executing instructions from content bundle code 58, connector code generator 50 for executing instructions from connector generation code 56, connector code execution engine 49 for executing connector code 54, and an exception handler 48 for assessing whether the outputs of a first content bundle and inputs of a second content bundle are compatible. It should be understood that exception handler 48 is configured to run when a connection between two content bundles is attempted.

During operation, investigator 30 accesses investigation server 12 as part of an investigation 14 into unusual activity on a network. For example, investigator 30 may wish, as part of investigation 14, to determine who accessed an administrator account on internally shared system 24. Shared system 24 in this case may be a Cisco router, for example. Investigator 30 logs into investigation server 12 and begins to construct an investigation.

It should be understood that investigation 14 involves specifying a set of input parameters 16a and a set of desired outputs 16b. In the above example, typical inputs 16a would include the username and hostname of the system or device being investigated and a time range over which the access occurred. Desired outputs 16b include a list of names of employees who accessed the system in the time range specified. Desired outputs may also include a list of IP addresses from which access to shared system 24 was achieved.

Investigation server 12 presents investigator 30 with a set of content bundles 20 for use in investigation 14. For example, in some arrangements, investigation server 12 may present a simple list of content bundles from which investigator 30 chooses based on the parameters (i.e., inputs 16a and desired outputs 16b) of investigation 14. In other arrangements, investigation server 12 presents a searchable interface in which investigator 30 inputs keywords (e.g., hostname, router, etc.) associated with content bundles. In still other arrangements, investigation server 12 presents a categorized list arranged by keyword.

Investigation server 12 then selects a subset 20a, 20b, and 20c of content bundles 20 based on inputs from investigator 30, i.e., keywords and the like. In some arrangements, investigation server 12 may automatically filter the set of content bundles 20 by keyword.

For example, consider a larger investigation 14 into all critical data that may have been accessed by recently terminated employees and/or known malicious IP addresses, given information that critical data on one internal system 24 may have been so accessed. The steps investigator 30 may consider are to 1) determine which employees and/or IP addresses that accessed that one internal system 24 had been recently terminated, 2) compare those employees and/or IP addresses to lists of terminated employees and known bad IP addresses, and 3) find out which systems was accessed by those terminated employees and/or bad IP addresses.

Based on input from investigator 30 about this investigation 14, investigation server 12 selects content bundles 20a, 20b, and 20c. In this example, content bundle 20a takes in a specified time range and a particular internal system that has been accessed and outputs a list of terminated employees. Content bundle 20b may then take in a list of employee names and output a list of critical systems that those employees had accessed after termination. Content bundle 20c may take in a list of systems accessed at particular times and output critical data accessed at those particular times.

By using these content bundles 20a, 20b, and 20c in concert, investigator 14 may determine the critical data accessed by terminated employees. Nevertheless, in conventional investigations, investigator 14 must still perform substantial work in collecting the output of one content bundle, say 20a, and forming an input into another content bundle, say 20b. Much of this work is tedious and repetitive, yet still requires substantial skill because of the care needed in correctly formatting the data so as to be a meaningful input into a new content bundle.

On the other hand, investigation server 12 provides investigator 30 with the capability of automatically generating XML code (or any like code) for converting output of one content bundle into input into another content bundle. In this way, investigator 14 merely needs to specify the order in which content bundles are to be used, or the topology of a network of content bundles, and investigation server 12 will generate the connections between the content bundles. The end result will be workflow 22 that automatically takes in inputs 16a of investigation 14 and returns values of outputs 16b.

It should be understood that, as discussed above, investigator 30 may view workflow 22 graphically on a browser window on workstation 30. Further details about such a graphical representation are discussed below in connection with FIGS. 3, 4, and 5.

Figure 3:
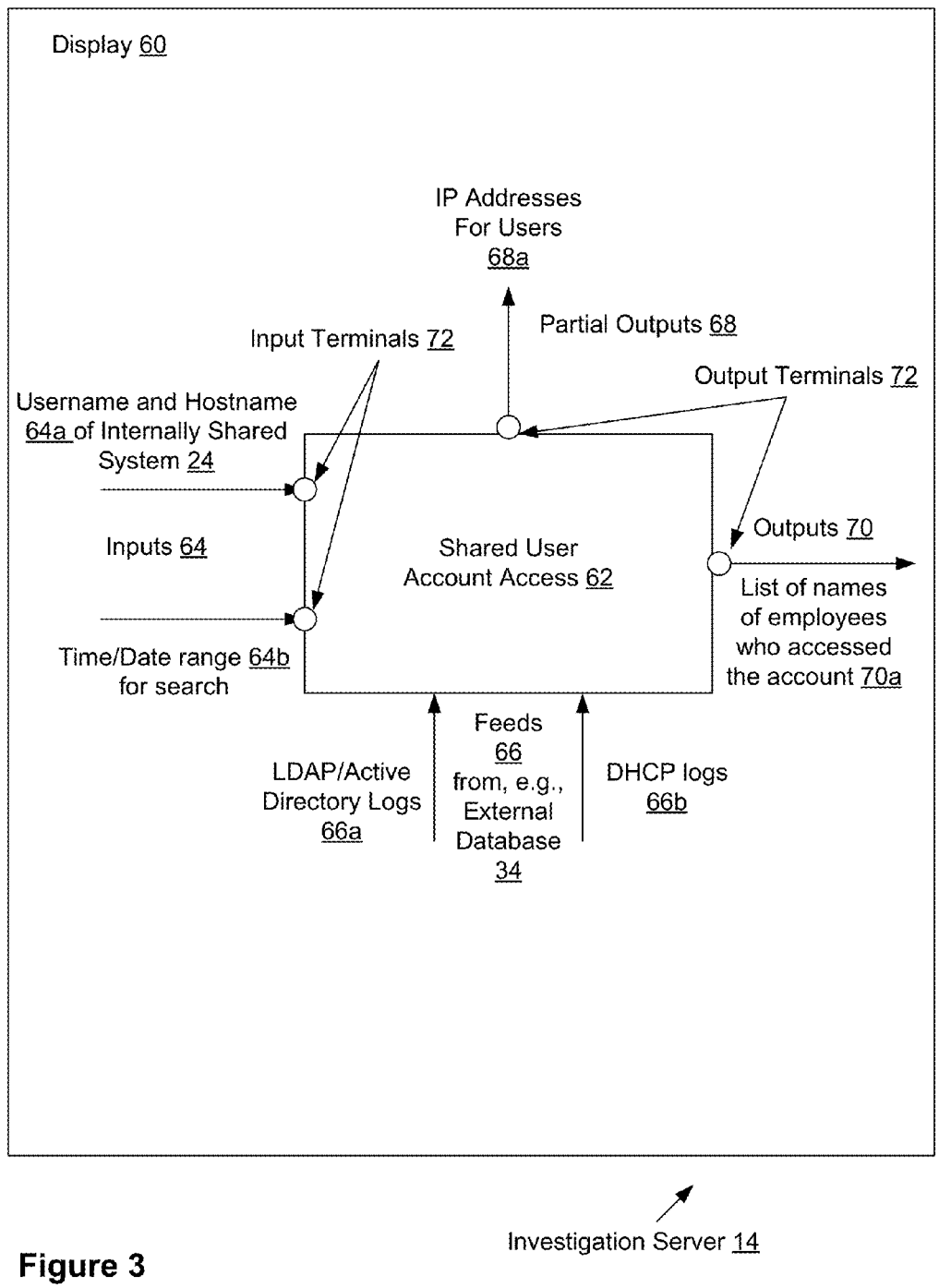
FIG. 3 is a block diagram illustrating an example display within the electronic environment shown in claim 1.

FIG. 3 illustrates a display 60 on workstation 36 containing a graphical representation 62 of a particular content bundle 20 (e.g., 20a as shown in FIG. 1). Graphical representation 62 ("graphic") includes input terminals 72 and output terminals 74.

Graphic 62 represents content bundle 20a for investigating shared user account access. Inputs 64 into input terminals 72 include a username and hostname of an internally shared system 24 (see FIG. 1), as well as a time range 64b over which access records will be searched. Outputs 70 include a list of names of employees who accessed the shared user account. In some arrangements, there are partial outputs 68 that include IP addresses from which those employees gained access. Further, investigator can add feeds 66 from external database 34, for example, LDAP/Active Directory logs 66a and DHCP logs 66b. Feeds 66 are invoked using a database query in content bundle code 58.

During operation, investigator 30 instructs investigation server 12 to select content bundle 20a by clicking on graphical representation 62 of content bundle 20a. Investigator 30 then specifies inputs 64 as a specific username and hostname for a device, and a time range for investigation; such a specification may be performed via text file or direct input. Content bundle 20a is then ready to be connected to another content bundle for the next phase of investigation 14. Details of this connection are discussed below in connection with FIG. 4.

Figure 4:
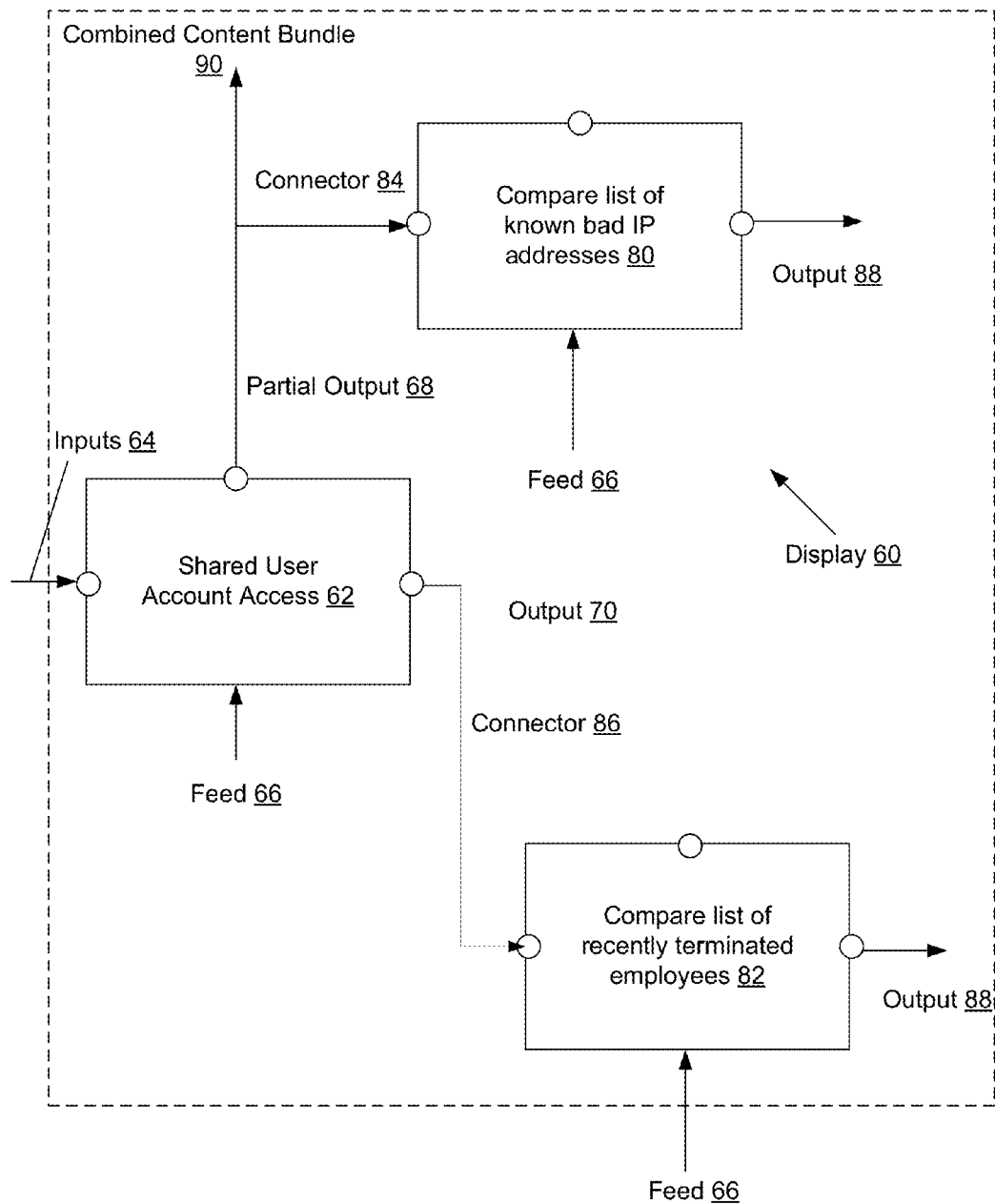
FIG. 4 is a block diagram illustrating another example display within the electronic environment shown in claim 1.

FIG. 4 illustrates example graphic representations 62, 80, and 82 of content bundles 20a, 20b, and 20c, respectively. In this case, content bundle 20a is as described in connection with FIG. 3. Content bundle 20b is configured to compare IP addresses to a known list of bad IP addresses from feed 66. Content bundle 20c is configured to compare a list of employee names to a list of recently terminated employees from feed 66.

Investigator 30 designs the investigation by placing one end of a connector 84 in an output terminal of graphic 62 and the other end of connector 84 in the input terminal of graphic 80. As illustrated in FIG. 4, partial output 68 of content bundle 20a is used as input into content bundle 20b. Upon the input and output terminals being connected by the graphic connector 84, investigation server 12, via connector code generator 50, runs connector generation code 56. Connector generation code 56 first invokes exception handler 48 to verify that the inputs and outputs are compatible. Once exception handler 48 has verified the compatibility, connector code generator 50 generates generation code 54 for translating outputs of content bundle 20a to inputs of content bundle 20b. In some arrangements, connector code generator 50 also generates database queries for feeds into content bundle 20b.

It should be understood that, in some arrangements, if exception handler 48 flags an exception due to an incompatibility between inputs and outputs, then investigation server 12 may delete connector 84.

Investigator 30 may repeat this connection step for other content bundles, say, content bundle 20c with connector 86. In the example illustrated in FIG. 4, the topology of the connections between the graphics 62, 80, and 82 are not serial as shown in FIG. 1, but are rather more multi-directional. The end result of these connections is a workflow that produces lists of bad IP addresses and terminated employees that accessed the shared account under investigation.

In some arrangements, investigator 30 may save workflow 22 as a compound content bundle 90. Specifically, investigation server 12 converts the various connectors and content bundles into a format reserved for content bundles. In doing this, investigator may save this new, compound content bundle 90 into storage 32 for later use. Further details of the use of such a content bundle are discussed below in connection with FIG. 5.

Figure 5:
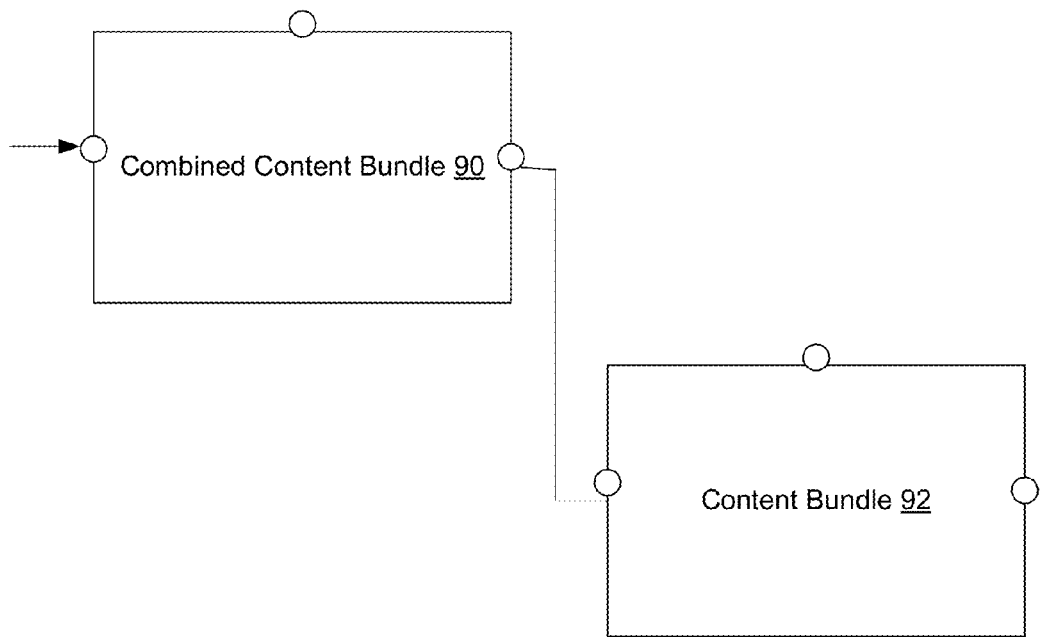
FIG. 5 is a block diagram illustrating another example display within the electronic environment shown in claim 1.

FIG. 5 illustrates combined content bundle 90 connected with another content bundle 92 for carrying out a particular investigation. For example, combined content bundle returns lists of terminated employees and bad IP addresses that accessed a shared account on a device of a specified hostname and username, within a specified time range. Content bundle 92 may, for example, take these lists in as input and return a list of critical internal systems that were accessed by these terminated employees and from the bad IP addresses.

FIG. 6 illustrates a method 100 of performing an investigation into potentially unusual activity in a computer network, the investigation being defined by a specified set of input parameters and a desired set of output parameters indicative of goals of the investigation, including steps 102, 104, and 106. In step 102, a set of content bundles is provided to an investigator, each content bundle performing a respective set of actions based on a set of inputs and providing a set of outputs upon performing the respective set of actions, the set of inputs including identifiers of entities interacting with the computer network. In step 104, a subset of the set of content bundles is selected by under control of an investigator based on the specified set of input parameters and the desired set of output parameters defining the investigation. In step 106, the content bundles of the subset of the set of content bundles are combined to form a single, complex workflow configured to produce the desired set of output parameters from the specified set of input parameters as a result of the investigation.

While various embodiments of the invention have been particularly shown and described, it will be understood by those skilled in the art that various changes in form and details may be made therein without departing from the spirit and scope of the invention as defined by the appended claims.

For example, while the examples above described graphical elements in a browser window in workstation 36, graphics may be arranged in any program capable of displaying them in display 60. For example, graphical elements may be represented in a graphics program such as Microsoft® Visio; in such a program, the graphical elements may be linked with code as described in connection with FIGS. 2, 3, and 4.

Furthermore, it should be understood that some embodiments are directed to investigation server 12, which is constructed and arranged to perform an investigation into potentially unusual activity in a computer network. Some embodiments are directed to a process of performing an investigation into potentially unusual activity in a computer network. Also, some embodiments are directed to a computer program product which enables computer logic to cause a computer to perform an investigation into potentially unusual activity in a computer network.

In some arrangements, investigation server 12 is implemented by a set of processors or other types of control/processing circuitry running software. In such arrangements, the software instructions can be delivered, within investigation server 12, either in the form of a computer program product 120 (see FIG. 2) or simply instructions on disk or in preloaded in memory 46 of investigation server 12, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of constructing an electronic tool for performing an investigation into unusual activity in a computer network, the investigation being defined by a specified set of input parameters and a set of output parameters specified by an investigator, the method comprising:

providing, by an investigation server, a set of content bundles to the investigator, each content bundle performing a respective set of actions including at least one of (i) an electronic access operation on data external to the investigation server and (ii) an electronic data transformation operation, the respective set of actions being based on a set of inputs and providing a set of outputs upon performing the respective set of actions, the set of inputs including identifiers of entities interacting with the computer network;

selecting, by the investigation server under control of the investigator, a subset of the set of content bundles based on the specified set of input parameters and the set of output parameters specified by the investigator defining the investigation; and connecting, by the investigation server under control of the investigator, the content bundles of the subset of the set of content bundles to form, as the electronic tool, a single, complex workflow configured to produce the set of output parameters specified by the investigator from the specified set of input parameters, thereby enabling the investigator to carry out the investigation.

2. A method as in claim 1,
wherein providing the set of content bundles to the investigator includes:
 displaying a graphical representation of particular content bundles of the set of content bundles in a graphical user interface (GUI) on a display.

3. A method as in claim 2,
wherein the graphical representation of each of the particular content bundles includes an input terminal and an output terminal;
wherein displaying the graphical representation of the particular content bundles includes:
 displaying a graphical representation of a set of connectors, a connector of the set of connectors converting values of the set of outputs of a first content bundle to values of the set of inputs of a second content bundle; and
wherein connecting the content bundles of the subset of the set of content bundles includes:
 moving a graphical representation of a connector of the set of connectors to connect the output terminal of the graphical representation of a first content bundle of the particular content bundles to the input terminal of the graphical representation of a second content bundle of the particular content bundles.

4. A method as in claim 3, further comprising:
verifying whether the set of outputs of the first content bundle are compatible with the set of inputs of the second content bundle; and
wherein connecting the content bundles of the subset of the set of content bundles further includes:
 fixing the graphical representation of the connector between the output terminal of the graphical representation of a first content bundle and the input terminal of the graphical representation of a second content bundle when the set of outputs of the first content bundle are compatible with the set of inputs of the second content bundle, and
 deleting the graphical representation of the connector when the set of outputs of the first content bundle are not compatible with the set of inputs of the second content bundle.

5. A method as in claim 4,
wherein connecting the content bundles of the subset of the set of content bundles further includes:
 upon fixing the graphical representation of the connector between the output terminal of the graphical representation of a first content bundle and the input terminal of the graphical representation of a second content bundle, generating XML code that provides instructions for carrying out a transfer of data between the first content bundle and the second content bundle.

6. A method as in claim 3,
wherein the set of inputs of the second content bundle include a set of feeds and a set of main inputs, each of the set of feeds originating from a database, each of the set of main inputs originating from at least one of another content bundle and direct input from the investigator;
wherein connecting the content bundles of the subset of the set of content bundles further includes:
 generating a query to be input into the database, the query being configured to extract data from the database for a feed of the set of feeds.

7. A method as in claim 6,
wherein the set of outputs of the first content bundle include a set of partial outputs and a set of main outputs, each of the set of partial outputs being configured to be input into at least one of another content bundle and another database, each of the set of main outputs being configured to be displayed to the investigator;
wherein the method further comprises:
 displaying each of the set of main outputs on a display device; and
 after connecting the content bundles of the subset of the set of content bundles, sending each of the set of partial outputs to the second content bundle.

8. A method as in claim 3, further comprising:
storing the single, complex workflow as a compound content bundle, the compound content bundle being configured to perform a set of actions based on a set of inputs and providing a set of outputs upon performing the respective set of actions, the set of inputs being the specified set of input parameters and the set of outputs being the set of output parameters specified by the investigator; and
storing a graphic representation of the compound content bundle to be available for use as a content bundle for a subsequent investigation.

9. An electronic apparatus constructed and arranged to construct an electronic tool for performing an investigation into unusual activity in a computer network, the investigation being defined by a specified set of input parameters and a set of output parameters specified by an investigator, the apparatus comprising:
memory; and
a controller including controlling circuitry, the controlling circuitry being constructed and arranged to:
 provide a set of content bundles to the investigator, each content bundle performing a respective set of actions including at least one of (i) an electronic access operation on data external to the investigation server and (ii) an electronic data transformation operation, the respective set of actions being based on a set of inputs and providing a set of outputs upon performing the respective set of actions, the set of inputs including identifiers of entities interacting with the computer network;
 select a subset of the set of content bundles based on the specified set of input parameters and the set of output parameters specified by the investigator defining the investigation; and
 connect the content bundles of the subset of the set of content bundles to form, as the electronic tool, a single, complex workflow configured to produce the set of output parameters specified by the investigator from the specified set of input parameters, thereby enabling the investigator to carry out the investigation.

10. An apparatus as in claim 9,
wherein the controlling circuitry constructed and arranged to provide the set of content bundles to the investigator is further constructed and arranged to:
 display a graphical representation of particular content bundles of the set of content bundles in a graphical user interface (GUI) on a display.

11. An apparatus as in claim 10,
wherein the graphical representation of each of the particular content bundles includes an input terminal and an output terminal;
wherein the controlling circuitry constructed and arranged to display the graphical representation of the particular content bundles is further constructed and arranged to:
 display a graphical representation of a set of connectors, a connector of the set of connectors converting values of the set of outputs of a first content bundle to values of the set of inputs of a second content bundle; and wherein the controlling circuitry constructed and arranged to connect the content bundles of the subset of the set of content bundles is further constructed and arranged to:

move a graphical representation of a connector of the set of connectors to connect the output terminal of the graphical representation of a first content bundle of the particular content bundles to the input terminal of the graphical representation of a second content bundle of the particular content bundles.

12. An apparatus as in claim 11, wherein the controlling circuitry is further constructed and arranged to:

verify whether the set of outputs of the first content bundle are compatible with the set of inputs of the second content bundle; and wherein the controlling circuitry constructed and arranged to connect the content bundles of the subset of the set of content bundles is further constructed and arranged to:

fix the graphical representation of the connector between the output terminal of the graphical representation of a first content bundle and the input terminal of the graphical representation of a second content bundle when the set of outputs of the first content bundle are compatible with the set of inputs of the second content bundle, and delete the graphical representation of the connector when the set of outputs of the first content bundle are not compatible with the set of inputs of the second content bundle.

13. An apparatus as in claim 12, wherein the controlling circuitry constructed and arranged to connect the content bundles of the subset of the set of content bundles is further constructed and arranged to:

upon fixing the graphical representation of the connector between the output terminal of the graphical representation of a first content bundle and the input terminal of the graphical representation of a second content bundle, generate XML code that provides instructions for carrying out a transfer of data between the first content bundle and the second content bundle.

14. An apparatus as in claim 11, further comprising:

a network interface;

wherein the set of inputs of the second content bundle include a set of feeds and a set of main inputs, each of the set of feeds originating from a database, each of the set of main inputs originating from at least one of another content bundle and direct input from the investigator;

wherein the controlling circuitry constructed and arranged to connect the content bundles of the subset of the set of content bundles is further constructed and arranged to:

generate a query to be input into the database, the query being configured to extract data from the database for a feed of the set of feeds.

15. An apparatus as in claim 14, wherein the set of outputs of the first content bundle include a set of partial outputs and a set of main outputs, each of the set of partial outputs being configured to be input into at least one of another content bundle and another database, each of the set of full outputs being configured to be displayed to the investigator;

wherein the controlling circuitry is further constructed and arranged to:

display each of the set of main outputs on a display device; and after connecting the content bundles of the subset of the set of content bundles, send each of the set of partial outputs to the second content bundle.

16. An apparatus as in claim 11, wherein the controlling circuitry is further constructed and arranged to:

the single, complex workflow as a compound content bundle, the compound content bundle being configured to perform a set of actions based on a set of inputs and providing a set of outputs upon performing the respective set of actions, the set of inputs being the specified set of input parameters and the set of outputs being the set of output parameters specified by the investigator; and store a graphic representation of the compound content bundle to be available for use as a content bundle for a subsequent investigation.

17. A computer program product having a non-transitory, computer-readable storage medium which stores instructions which, when executed by a computer, cause the computer to perform a method of constructing an electronic tool for performing an investigation into unusual activity in a computer network, the investigation being defined by a specified set of input parameters and a set of output parameters specified by an investigator, the method comprising:

providing, by an investigation server, a set of content bundles to the investigator, each content bundle performing a respective set of actions including at least one of (i) an electronic access operation on data external to the investigation server and (ii) an electronic data transformation operation, the respective set of actions being based on a set of inputs and providing a set of outputs upon performing the respective set of actions, the set of inputs including identifiers of entities interacting with the computer network;

selecting, by the investigation server under control of the investigator, a subset of the set of content bundles based on the specified set of input parameters and the set of output parameters specified by the investigator defining the investigation; and connecting, by the investigation server under control of the investigator, the content bundles of the subset of the set of content bundles to form, as the electronic tool, a single, complex workflow configured to produce the set of output parameters specified by the investigator from the specified set of input parameters, thereby enabling the investigator to carry out the investigation.

18. A computer program product as in claim 17, wherein providing the set of content bundles to the investigator includes:

displaying a graphical representation of particular content bundles of the set of content bundles in a graphical user interface (GUI) on a display.

19. A computer program product as in claim 18, wherein the graphical representation of each of the particular content bundles includes an input terminal and an output terminal;

wherein displaying the graphical representation of the particular content bundles includes:

displaying a graphical representation of a set of connectors, a connector of the set of connectors converting values of the set of outputs of a first content bundle to values of the set of inputs of a second content bundle; and wherein connecting the content bundles of the subset of the set of content bundles includes:

moving a graphical representation of a connector of the set of connectors to connect the output terminal of the graphical representation of a first content bundle of the particular content bundles to the input terminal of the graphical representation of a second content bundle of the particular content bundles.

20. A computer program product as in claim 19, further comprising:
verifying whether the set of outputs of the first content bundle are compatible with the set of inputs of the second content bundle;
wherein connecting the content bundles of the subset of the set of content bundles further includes:
fixing the graphical representation of the connector between the output terminal of the graphical representation of a first content bundle and the input terminal of the graphical representation of a second content bundle when the set of outputs of the first content bundle are compatible with the set of inputs of the second content bundle, and
deleting the graphical representation of the connector when the set of outputs of the first content bundle are not compatible with the set of inputs of the second content bundle.

\* \* \* \* \*